(12) United States Patent
Gnech et al.

(10) Patent No.: US 10,649,977 B2
(45) Date of Patent: *May 12, 2020

(54) ISOLATION ANOMALY QUANTIFICATION THROUGH HEURISTICAL PATTERN DETECTION

(71) Applicant: International Business Machines Corporation, Armonk, NY (US)

(72) Inventors: Thomas H. Gnech, Herrenberg (DE); Steffen Koenig, Heidelberg (DE); Philipp A. Tölle, Zurich (CH)

(73) Assignee: International Business Machines Corporation, Armonk, NY (US)

(*) Notice: Subject to any disclaimer, the term of this patent is extended or adjusted under 35 U.S.C. 154(b) by 190 days.

This patent is subject to a terminal disclaimer.

(21) Appl. No.: 15/801,385

(22) Filed: Nov. 2, 2017

(65) Prior Publication Data
US 2018/0052882 A1    Feb. 22, 2018

Related U.S. Application Data

(63) Continuation of application No. 14/577,205, filed on Dec. 19, 2014, now Pat. No. 9,910,882.

(51) Int. Cl.
*G06F 16/23*    (2019.01)
(52) U.S. Cl.
CPC .................. *G06F 16/2365* (2019.01)
(58) Field of Classification Search
CPC .................. G06F 16/2365; G06F 16/2379
See application file for complete search history.

(56) References Cited

U.S. PATENT DOCUMENTS 5,819,226 A    10/1998  Gopinathan et al.
6,144,941 A    11/2000  Hotti et al.
(Continued)

FOREIGN PATENT DOCUMENTS

WO    2007042837 A1    4/2007

OTHER PUBLICATIONS

Costante, et al., "Database Anomalous Activities: Detection and Quantification", 2013 International Conference on Security and Cryptography (SECRYPT) (2013), 6 pages.
(Continued)

*Primary Examiner* — Cheyne D Ly
(74) *Attorney, Agent, or Firm* — Edward J. Wixted, III

(57) ABSTRACT

In an approach for calculating a probability of a consistency violation of a transaction in a database management system, a processor receives a plurality of transactions within a predetermined time period. A processor identifies a first pattern in a first transaction of the plurality of transactions based on at least an isolation level of the transaction. A processor identifies a second pattern, wherein the second pattern is the cooperation between the first transaction and the second transaction. A processor determines that the first pattern of the first transaction substantially matches a preexisting pattern, wherein the preexisting pattern corresponds to values for a mathematical model for estimating a percentage of transactions in violation of consistency criteria. A processor extracts values from the first transaction based on the determined preexisting pattern. A processor calculates the mathematical model using the values from the first transaction and the values from the preexisting pattern.

20 Claims, 4 Drawing Sheets

(56) References Cited

U.S. PATENT DOCUMENTS

| | | | |
|---|---|---|---|
| 7,653,665 B1 | 1/2010 | Stefani et al. | |
| 7,815,106 B1 | 10/2010 | McConnell | |
| 7,865,427 B2 | 1/2011 | Wright et al. | |
| 7,908,645 B2 | 3/2011 | Varghese et al. | |
| 8,019,678 B2* | 9/2011 | Wright | G06Q 20/04 705/35 |
| 8,504,876 B2 | 9/2013 | Mork et al. | |
| 8,561,184 B1 | 10/2013 | Marsa et al. | |
| 8,724,904 B2 | 5/2014 | Fujiki et al. | |
| 8,739,278 B2 | 5/2014 | Varghese | |
| 8,762,243 B2 | 6/2014 | Jenkins et al. | |
| 9,348,839 B2 | 5/2016 | Fauser et al. | |
| 2005/0091532 A1* | 4/2005 | Moghe | H04L 63/1408 726/4 |
| 2007/0174185 A1 | 7/2007 | McGoveran | |
| 2010/0114841 A1 | 5/2010 | Holenstein et al. | |
| 2011/0153566 A1* | 6/2011 | Larson | G06F 9/466 707/638 |
| 2011/0282778 A1* | 11/2011 | Wright | G06Q 20/04 705/38 |
| 2016/0179827 A1 | 6/2016 | Gnech et al. | |
| 2017/0109397 A1 | 4/2017 | Gnech et al. | |

OTHER PUBLICATIONS

Fekete, et al., "Quantifying Isolation Anomalies", VLDB '09, Aug. 24-28, 2009, Lyon, France, Copyright 2009, 12 pages.

Golab, et al., "Client-centric Benchmarking of Eventual Consistency for Cloud Storage Systems", 2014 IEEE 34th International Conference on Distributed Computing Systems, Jun. 30-Jul. 3, 2014, ISBN: 978-1-4799-5169-7, pp. 493-502.

Jorwekar, et al.; "Automating the Detection of Snapshot Isolation Anomalies", VLDB '07, Sep. 23-28, 2007, Vienna, Austia, Copyright Date 2007, pp. 1263-1274.

Liu, et al., "Isolation-based Anomaly Detection" ACM Transactions on Knowledge Discovery from Data, vol. V, No. N, Month 20YY, 44 pages.

Zellag, et al., Consistency Anomalies in Multi-tier Architectures: Automatic Detection and Prevention; The VLDB Journal; Published Online: Jun. 4, 2013, 26 pages.

IBM, "List of Patent Applications Treated as Related", Dated Nov. 2, 2017, 2 pages.

\* cited by examiner

ISOLATION ANOMALY QUANTIFICATION THROUGH HEURISTICAL PATTERN DETECTION

BACKGROUND OF THE INVENTION

The present invention relates generally to the field of database application development, and more particularly to quality assurance in database management systems.

Most common database management systems have a multi-tier architecture where a client sends a request to a server, which processes the request to a middle-tier server or database, which then sends the request to a back-tier database. This process can be done concurrently by many clients. Therefore, at the middle-tier and back-tier, a degree of concurrency control is necessary for the system to operate. In concurrency control and quality assurance with the transactional workloads there is oftentimes a tradeoff between data consistency and performance of the system.

One technique to maintain the concurrency and quality of the system is to adjust the isolation level of a database management system (DBMS). The isolation level determines how transaction integrity is visible to other users and systems. If the isolation level is lower, there is an increased ability of users to access the data at the same time, but also an increase in the amount of concurrency users can possibly encounter. A lower isolation level results in a system that provides more opportunity for anomalies to appear in the database. In lower isolation levels there is an increase in operating speed and performance of the system, which makes adjusting the isolation levels of the DBMS a viable option for processes where speed is a priority. Conversely, by increasing the consistency level of the system there is a reduction in types of concurrency effects that users may encounter. This type of database system will require a high degree of domain knowledge by an operator to maintain comparable efficiency levels, but fewer anomalies may appear in the system.

SUMMARY

Aspect of an embodiment of the present invention disclose an approach for calculating a probability of a consistency violation of a transaction in a database management system. A processor receives a plurality of transactions within a predetermined time period. A processor identifies a first pattern in a first transaction of the plurality of transactions based on at least an isolation level of the transaction. A processor identifies a second pattern, wherein the second pattern is the cooperation between the first transaction and the second transaction. A processor determines that the first pattern of the first transaction substantially matches a preexisting pattern, wherein the preexisting pattern corresponds to values for a mathematical model for estimating a percentage of transactions in violation of consistency criteria. A processor extracts values from the first transaction based on the determined preexisting pattern. A processor calculates the mathematical model using the values from the first transaction and the values from the preexisting pattern.

DETAILED DESCRIPTION

Figure 1:
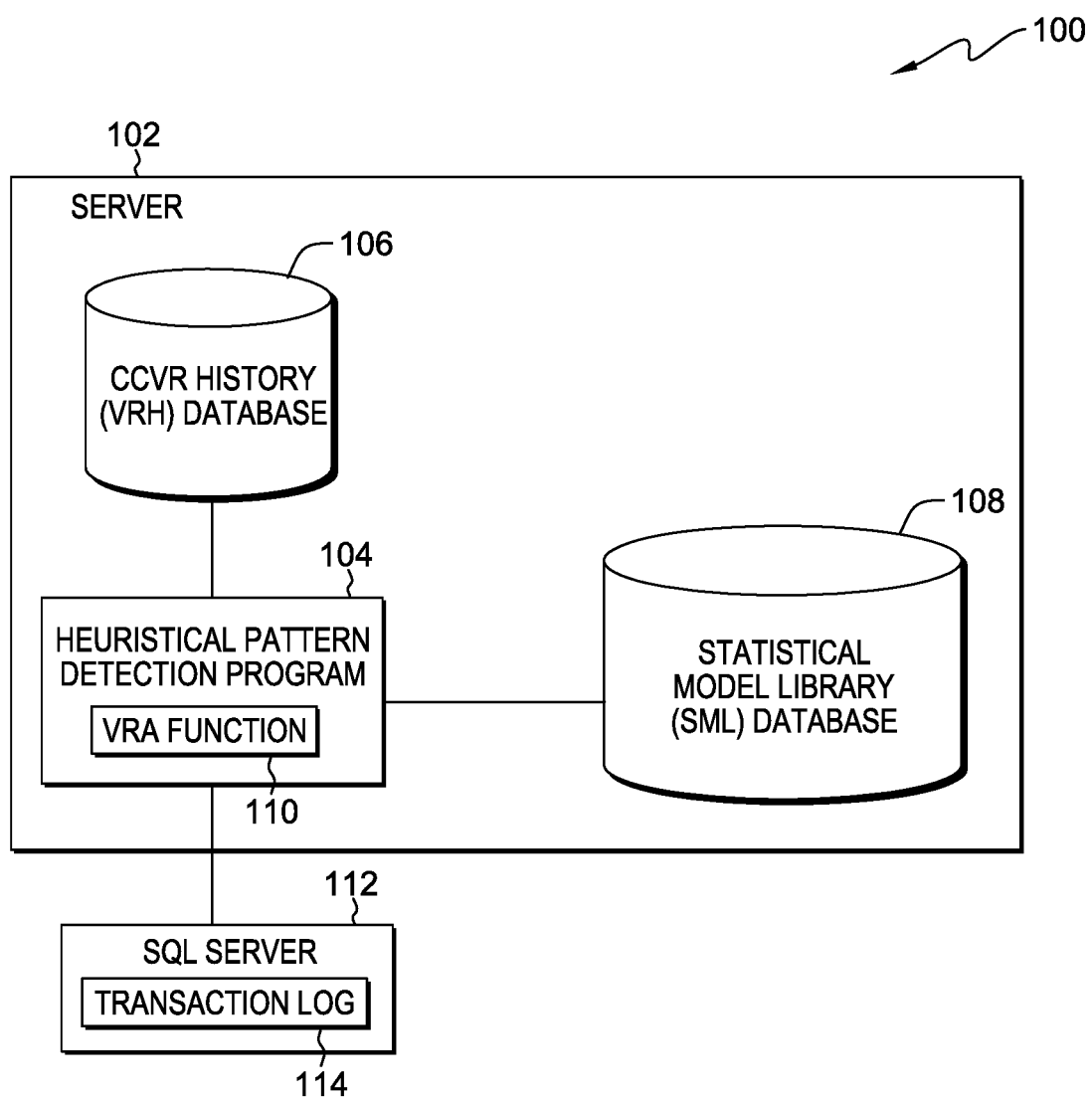
FIG. 1 depicts a block diagram of a computing system environment, in accordance with one embodiment of the present invention.

Aspects of the present invention may be embodied as a system, method or computer program product. Embodiments of the present invention are operative to increase processing performance without lowering the isolation level to an undesirable level. Embodiments of the present invention recognize that current optimization strategies rely on best-practice and best guess approaches and that a high degree of domain knowledge is necessary to achieve a reasonable decision, resulting in an increase in price for database management. Embodiments of the present invention recognize that no objective method is currently used to measure or predict inconsistencies in database management system development and transactional application development.

Database management systems (DBMS s) utilize a rate value calculated from the number of declined concurrent access attempts to a same but already clogged resource (e.g. page, record, row, bus, computer processing unit (CPU), etc.). This rate value is usually referred to as the "contention rate". In the context of DBMS, the contention rate expresses the percentage of failed lock requests against said resource. Hence, the contention rate measures effects of prevented causes of potential inconsistencies. In addition to the contention rate, the present invention predicts a Consistency Criteria Violation Rate (CCVR) (described in-depth in FIG. 4). The CCVR expresses the number of transactions in a monitored time-span, which are likely to experience a consistency anomaly, which in turn will lead to inconsistent data. Thus, the CCVR measures causes for accepted potential inconsistencies that are not intended to be prevented, but for which a quantification is required.

Embodiments of the present invention disclose a method, computer program product, and computer system that retrieve a sampling of the transactional flow into a DBMS. Embodiments of the present invention identify recurring transaction patterns in order to derive certain configuration parameters. The determined configuration parameters are used to parameterize a statistical model which is provided by an extendable statistical model library. The parameterized statistical model is calculated to a single figure, which extrapolates the CCVR for the subsequent transaction flow until the next transaction is taken and the process is repeated. The CCVR expresses the percentage of transactions in the monitored time frame, violating the consistency criteria of the Atomicity, Consistency, Isolation, Durability (ACID) property set. ACID is a set of properties that guarantee that database transactions are processed reliably. Atomicity requires that each transaction be "all or nothing", meaning if part of the transaction fails the entire transaction fails.

Consistency ensures that any transaction will bring the database from one valid state to another. Isolation ensures that the concurrent execution of transactions results in a system state that would be obtained if transactions were executed serially i.e. one after the other. Durability means that once a transaction has been committed, it will remain so, even in the event of power loss or crashes. The CCVR values of the transactions and of the extrapolation are stored in a CCVR History (VRH) for further analysis and to calculate Overall Violation Rate (OVR) by a proposed Violation Rate Analyzer (VRA).

The program code may execute entirely on a user's computer, partly on the user's computer, as a stand-alone software package, partly on the user's computer and partly on a remote computer or entirely on a remote computer or server. In one embodiment, a remote computer may be connected to the operator's computer through any type of network, including a local area network (LAN) or a wide area network (WAN), or the connection may be made to an external computer (for example, through the Internet using an Internet Service Provider).

The present invention will now be described in detail with reference to the Figures.

FIG. 1 depicts a diagram of a computing environment 100 in accordance with one embodiment of the present invention. FIG. 1 provides an illustration of one embodiment and does not imply any limitations regarding to the environment in which different embodiments maybe implemented. In the depicted embodiment, computing environment 100 includes, but is not limited to server 102, Heuristical Pattern Detection Program (HPDP) 104, Consistency Criteria Violation Rate History (VRH) Database 106, Statistical Model Library (SML) Database 108, SQL server 112, and transaction log 114. As depicted, computing environment 100 provides an environment for HPDP 104 to locate and analyze transactions (transaction refers to, but is not limited to, any operation, function, transaction, or other process present in a transaction log, such as transaction log 114) retrieved from transaction log 114. In the depicted embodiment, HPDP 104, VRH database 106, and SML database 108 are all located on server 102. Computing environment 100 may contain additional servers, computing devices, or other devices not shown.

Server 102 may be a management server, a web server, or any other electronic device or computing system capable of processing program instructions and receiving and sending data. In some embodiments, server 102 may be a laptop computer, tablet computer, netbook computer, personal computer (PC), a desktop computer, or any programmable electronic device capable of communicating with SQL server 112. In other embodiments, server 102 may represent a server computing system utilizing multiple computers as a system, such as in a cloud computing environment. In another embodiment, server 102 represents a computing system utilizing clustered computers and components to act as a single pool of seamless resources. In the depicted embodiment, server 102 contains HPDP 104, VRH database 106, and SML database 108. In other embodiments, HPDP 104, VRH 106, SML 108 may be located on another server, or a combination of server 102 and other servers, providing HPDP 104 is accessible to VRH database 106, SML database 108, and transaction log 114 and provided HPDP 104 has access to VRH database 106, SML database 108, and transaction log 114.

HPDP 104 operates to receive, analyze, and send data between VRH database 106, SML database 108, SQL server 112, and transaction log 114. In one embodiment, HPDP 104 receives transactions from transaction log 114 to calculate the CCVR and calculates the Overall Violation Rate (OVR) by a proposed Violation Rate Analyzer (VRA) (See FIG. 3 below for description). In another embodiment, HPDP 104 analyzes transactions and identifies recurring transaction patterns to derive certain configuration parameters for selecting future transactions. In another embodiment, an operator determines transaction parameter to receive from transaction log 114. In one embodiment, HPDP 104 continues to receive random transactions from transaction log 114 and does not configure parameters. In one embodiment, HPDP 104 uses a dynamic feedback system to skip certain transactions that would not provide accurate or valuable CCVRs. In one embodiment, transactions are received from SQL server 112 and parameterizes a statistical model which is provided by SML database 108. In one embodiment, VRH database 106 receives the result from HPDP 104 to store the data. In other embodiments, information stored to VRH database 106, and SML database 108 may be combined and stored to a single location. In other embodiments, HPDP 104 may reside on another server or another computing device, provided HPDP 104 is accessible to VRH database 106, SML database 108, and Transaction log 114 and provided HPDP 104 has access to VRH database 106, SML database 108, and Transaction log 114.

VRH database 106 is a repository that may be written and read by HPDP 104. In one embodiment, CCVRs are stored on VRH database 106. In some embodiments, VRH database 106 calculates the OVR by a proposed VRA (See FIG. 3 below for description). In some embodiments, VRH database 106 can be located on sever 102, another server, computer, network or other computing device provided HPDP 104 can access VRH database 106. In other embodiments, VRH database 106 may reside on another server, or another computing device, provided that VRH database 106 is accessible to the HPDP 104. In some embodiments, VRH database 106 resides on server 102. In other embodiments, VRH database 106 may reside on another server or another computing device, provided that VRH database 106 is accessible to HPDP 104.

SML database 108 is a repository that may be written and read by HPDP 104. In one embodiment, transactional patterns with associated mathematical models, which can be parameterized, are stored on SML database 108. In one embodiment, SML database 108 is where the calculated parameterized statistical models, generated by HPDP 104, are stored. In one embodiment, SML database 108 is includes transaction logs analyzed by HPDP 104. In other embodiments, SML database 108 can contain, but is not limited to containing, an isolation level, a pattern detection algorithm, a generic pattern description for the pattern detection algorithm, a stochastic model. In other embodiments, a third party or operator can populate SML database 108 with a quantity of transaction patterns with the appropriate associated mathematical model, isolation level, pattern detection algorithm, generic pattern description for the pattern detection algorithm, stochastic model, or other data that fulfill the user's (e.g., customer, consumer, operator) requirements. In some embodiments, VRH database 106 calculates the OVR by a proposed VRA (see FIG. 3 below for description). In some embodiments, SML database 108 is located on sever 102, another server, computer, network or other computing device provided HPDP 104 can access VRH database 106. In other embodiments, SML database 108 may reside on another server, or another computing device, provided that SML database 108 is accessible to the HPDP 104. In some embodiments, SML database 108 resides on server 102. In other embodiments, SML database 108 may reside on another server or another computing device, provided that SML database 108 is accessible to HPDP 104.

VRA function 110 operates to calculate an OVR for HPDP 104 to potentially use in future analysis of transaction in place of other CCVRs. VRA function 110 takes a quantity of CCVRs from VRH database 106 and creates an average CCVR value (the OVR). CCVRs may come from VRH database 106 or any source that has CCVR values such as operator created values, third party created values, or predefined CCVRs. In some embodiments, this information may be preinstalled on server 102, server 108, VRH database 106, or other locations that HPDP 104 has access to.

SQL server 112 may be a management server, a web server, or any other electronic device or computing system capable of processing program instructions and receiving and sending data. In some embodiments, SQL server 112 may be a laptop computer, tablet computer, netbook computer, personal computer (PC), a desktop computer, or any programmable electronic device capable of communicating with HPDP 104. In other embodiments, SQL server 112 may represent a server computing system utilizing multiple computers as a system, such as in a cloud computing environment. In another embodiment, SQL server 112 represents a computing system utilizing clustered computers and components to act as a single pool of seamless resources. In the depicted embodiment SQL server 112 contains transaction log 114. In other embodiments, transaction log 114 may be located on another server, or a combination of SQL server 112 and other servers, providing HPDP 104 is accessible to transaction log 114 and provided HPDP 104 has access to transaction log 114.

Transaction log 114 is a repository that may be read by HPDP 104. In some embodiments, transaction log 114 is a location where recorded transactions and modifications made by SQL server 112 are stored. In one embodiment, transactions are truncated on a regular basis by a program on SQL server 112 (not shown). In other embodiments, transactions are truncated irregularly or at operator defined intervals, to, for example, prevent SQL server 112 from reaching maximum capacity. In one embodiment, HPDP 104 continuously receives transactions from transaction log 114. In other embodiments, HPDP 104 receives transactions from transaction log 114 at an irregular interval or at operator defined intervals. In some embodiments, transactions are of different sizes, and/or widths, based on the type of transaction located in transaction log 114. In one embodiment, all transactions located within transaction log 114 are of the same size and width. A transaction refers to, but is not limited to, any operation, function, or other process that is present in transaction log 114. A transaction is a unit of work performed within a DBMS against a database, and treated in a coherent and reliable way independent of other transactions. In one embodiment, transactions located on transaction log 114 are used by HPDP to calculate CCVRs.

Figure 2:
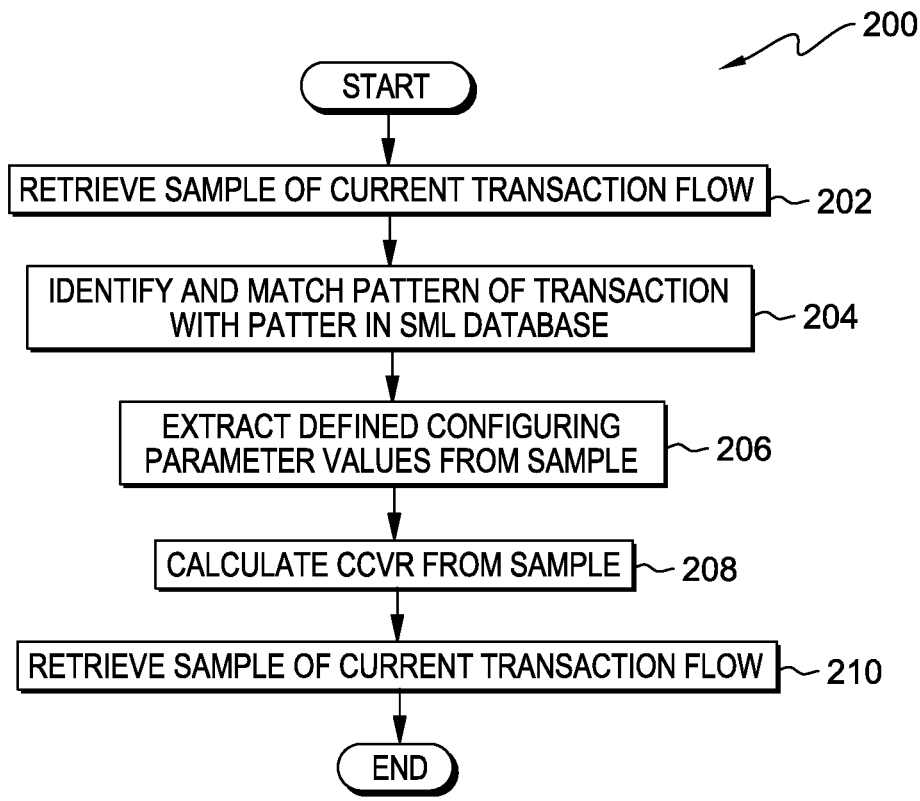
FIG. 2 is a flowchart depicting operational steps of a heuristical pattern detection program within the computer system environment of FIG. 1 for detecting anomalies within transactions, in accordance with one embodiment of the present invention.

FIG. 2 depicts flowchart 200 of HPDP 104 executing within computing environment 100 of FIG. 1, in accordance with an embodiment of the present invention. Process 200 represents the process of HPDP 104 retrieving a sample and calculating the CCVR. HPDP 104 retrieves a transaction from transaction log 114 and uses operator set parameters to parameterize a statistical model which is provided by SML database 108. HPDP 104 retrieves the parameterized statistical model and calculates a single value that is extrapolated into a CCVR for a transaction occurring after the current transaction. As depicted in FIG. 2, process 200 depicts steps performed by HPDP 104 in receiving a transaction, analyzing a transaction, creating a CCVR and storing the data in a VRH database 106.

In step 202, HPDP 104 retrieves a transaction from transaction log 114. In one embodiment, HPDP 104 is a transaction program (TP) that communicates with transaction log 114 to exchange data. HPDP 104 completes the exchange of data to retrieve the current transaction and analyze the transaction to determine the CCVR. In one embodiment, transaction size and width is set by an operator and is adjusted with a dynamic feedback system or an optimization system for each transaction. In one embodiment, transaction size and width is set by an operator and the transaction size does not change. In one embodiment, HPDP 104 withdraws a transaction any time a transaction is truncated in SQL server 112. Withdrawing transactions allows for a continuous sampling by HPDP 104 to locate anomalies. In one embodiment, HPDP 104 retrieves a random transaction from transaction log 114. In another embodiment, HPDP 104 uses machine learning technologies such as dynamic feedback systems or optimization to create more detailed set of requirements for selecting transactions from transaction log 114 withdrawn from transaction log 114. In one embodiment, HPDP 104 only takes transactions set forth by the operator, or a third party that establishes certain requirements and parameters for HPDP 104.

In step 204, HPDP 104 identifies a pattern within the retrieved transaction, and compares this pattern to patterns located in SML database 108. HPDP 104 searches for a pattern in SML database 108 that is substantially similar to the transaction from transaction log 114. In one embodiment, SML database 108 contains a quantity of statistical models that are a formalization of relationships between variables in the form of mathematical equations, describing how one or more random variables are related to one or more other variables. In one embodiment, SML database 108 contains transactional patterns with associated mathematical models, which can be parameterized. SML database 108 also provides statistical models. In other embodiments, SML database 108 contains patterns relating to the cooperation of transactions. In one embodiment, SML database 108 contains a quantity of transactional patterns with associated mathematical models, or statistical models, and the values are supplied by the operator, or by a third party. In other embodiments, SML database 108 contains no transactional patterns with associated mathematical models, or statistical models, and the values are supplied by a default set of data, an operator, or a third party that created a quantity of transactional patterns for a customer.

In step 206, HPDP 104 configures a set of parameters specific to the transaction from the transactional patterns with associated mathematical models, and statistical models from SML database 108. HPDP 104 takes this set of parameters for a transaction and creates a parameterized statistical model. In one embodiment, the subsequent transaction pattern is sent to HPDP 104 for analysis once the prior transaction has had the set of parameters specified. In one embodiment, HPDP 104 uses a dynamic feedback system or an optimization system to skip transactional patterns that have previously been parameterized.

In step 208, HPDP 104 calculates the CCVR from the sample by reducing the parameterized statistical model to a value for the transaction. This value is to be calculated is referred to as a CCVR. The CCVR expresses the percentage of transactions in the monitored time frame, violating the consistency criteria of the ACID property set. In one embodiment, HPDP 104 calculates CCVR according to the steps described in reference to FIG. 4 (see below).

In step 210, HPDP 104 retrieves a sample of the current transaction flow and parameterizes the subsequent transaction using data received from SML database 108. In one embodiment, the subsequent transaction width and size is a default value and properly adjusted with a dynamic feedback method to optimize transaction rate and transaction width to better defined patterns in each subsequent transaction. In one embodiment, HPDP 104 retrieves the transaction immediately after a prior transaction. In one embodiment, HPDP 104 retrieves a random subsequent transaction from transaction log 114. In another embodiment, HPDP 104 uses optimization to create more detailed set of requirements for taking a subsequent transaction. In one embodiment, HPDP 104 only retrieves subsequent transactions set forth by the operator, or a third party that sets certain requirements and parameters for HPDP 104.

Figure 3:
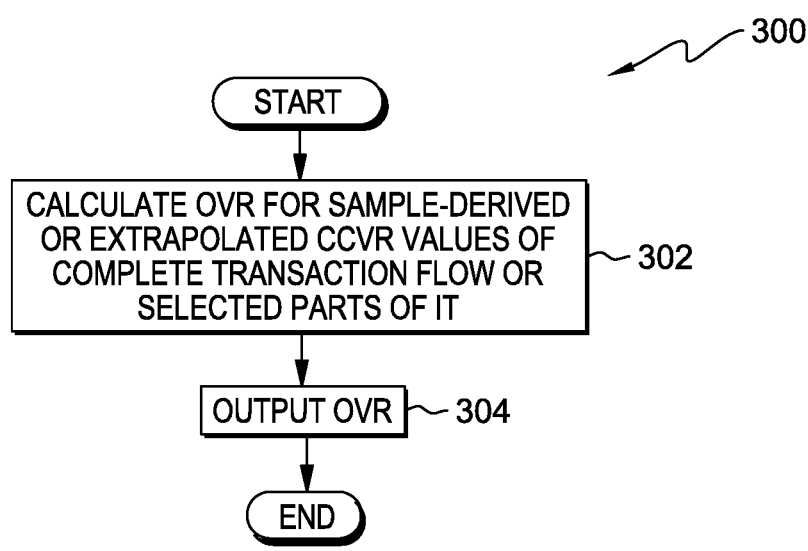
FIG. 3 is a flowchart depicting operational steps of a violation rate function for detecting anomalies within transactions, in accordance with one embodiment of the present invention.

FIG. 3 depicts flowchart 300 of VRA function 110 executing within the computing environment of FIG. 1, in accordance with an embodiment of the present invention. HPDP 104 calculates an OVR from a sample of CCVRs to create an average CCVR that is used in future processes to determine anomalies within computing environment 100. VRA function 110 increases the speed of HPDP 104 by removing the need to create a new CCVR for each new transaction and use an average CCVR to give an approximation of anomalies.

In step 302, VRA function 110 calculates an OVR for a sample-derived or extrapolated CCVR values of complete transaction flow or selected parts of the transaction flow. VRA function performs the calculation of the VRA by receiving a plurality CCVRs from VRH database and calculating an overall or average CCVR value. In one embodiment, the OVR is calculated from a selection of all transactions. The selection of transactions can be chosen by an operator, a third party, or by machine learning technologies within HPDP 104 such as an optimization. In one embodiment, the OVR is calculated using all CCVR values in VRH database 106.

In step 304, VRA function 110 outputs the OVR to CCVR database 106 to be used by HPDP 104 for analysis performed on future transactions. In one embodiment, the OVR will replace all individual transaction calculated, or extrapolated, CCVR values. In one embodiment, the OVR will replace a selection of transaction calculated, or extrapolated, CCVR values. This selection can be if the extrapolation time window for a transaction is greater than a specified value, a selection of transactions set by the operator, or for specific transactions that HPDP 104 machine learning technology such as optimization decides the OVR should be used over transaction specific CCVRs.

Figure 4:
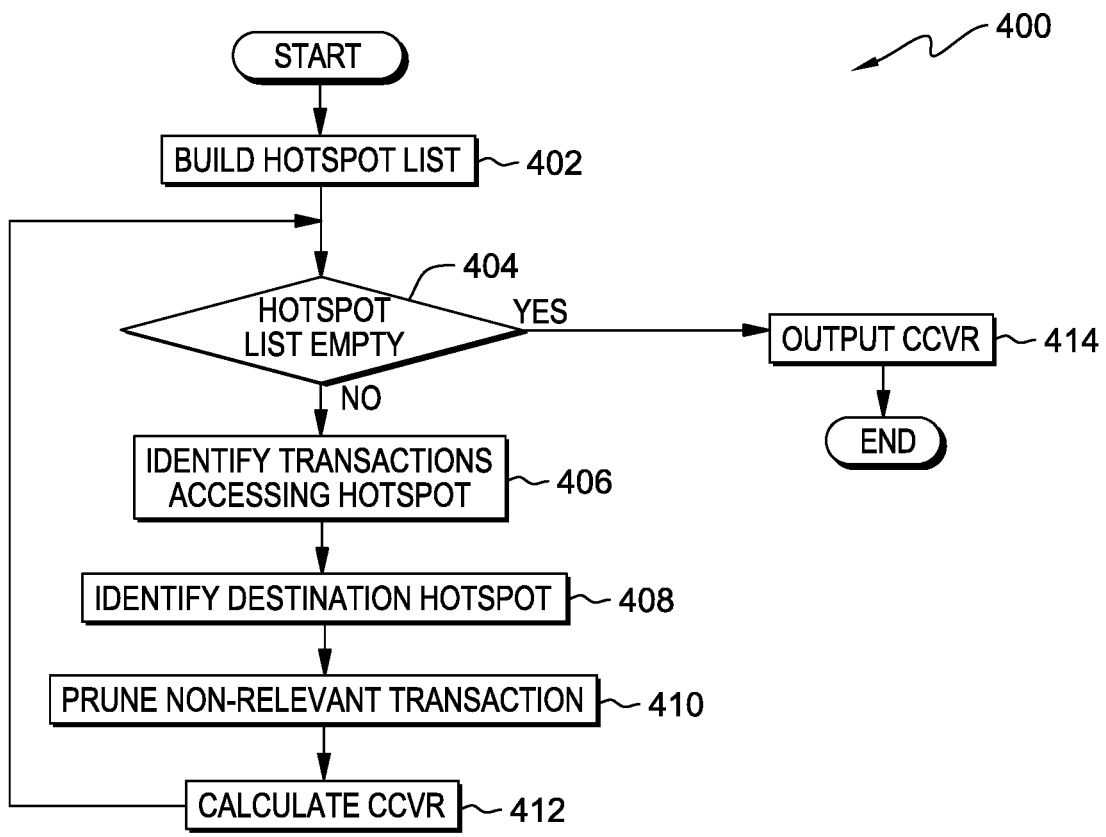
FIG. 4 is a flowchart depicting operational steps of a Consistency Criteria Violation Rate (CCVR) determination and implementation by a heuristical pattern detector program, in accordance with one embodiment of the present invention.

FIG. 4 depicts flowchart 400 of HPDP 104 for calculating the CCVR of the transactions within the computing environment of FIG. 1, in accordance with an embodiment of the present invention. In accordance with this embodiment of the present invention, FIG. 4 represents an embodiment of flowchart 200 steps 204, 206 and 208 to calculate the CCVR for a transaction. HPDP 104 creates a hotspot list of transaction log 114, by identifying the transactions accessing the hotspot, pruning the non-relevant transactions and calculating a CCVR for the quantity of transactions FIG. 4, process 400 depicts an embodiment of the steps performed by HPDP 104 in calculating a CCVR for a transaction based on the probability of collisions between transactions of certain type.

In Step 402, HPDP 104 builds a hotspot list from the list of transactions in transaction log 114 that are accessible by HPDP 104. A hotspot is a portion of the SQL server where a high portion of executed transactions occur or where anomalies are more likely to be present. A hotspot is measured in number of consecutive rows accessed by higher than usual operations. Hotspots have an undefined length because of the variability of accessed rows, quantity of operations accessing this specified area, or runtime of the operation. In one embodiment, HPDP 104 determines a length of all accessed rows, timing information, runtime, and gap-time to build a hotspot. This determination of a length is referred to as the measurement interval of the hotspot. If the measurement interval is of a longer length, it will cause the hotspot to accumulate more violations. Thus increase in violations in the hotspot will result in transactions being excluded from the hotspot, which will give less than desired results in most instances. In one embodiment, HPDP 104 uses machine learning technology to calculate an efficient and conclusive hotspot length through optimization. In other embodiments, HPDP 104 determines the length of the hotspots by an operator set value, by a third party supplied value, or by a random sampling of hotspot length and using dynamic feedback methods to optimize hotspot length. In other embodiments, HPDP 104 uses dynamic feedback methods or machine learning technologies to create an average or optimum hotspot size for all future transactions for calculating the CCVR.

In decision 404, HPDP 104 determines if the hotspot list is populated or empty. A hotspot list is populated if new transactions that HPDP 104 gathers from transaction log 114 are added that were previously accessing this hotspot location for prior transaction. If HPDP 104 determines there are no new entries in the Hotspot List (HSL) (decision 404, yes branch), then HPDP 104 outputs a CCVR value that was used previously. If HPDP 104 determines there are new entries in the hotspot list (decision 404, no branch), then HPDP 104 continues to step 406. In one embodiment, HPDP 104 outputs an OVR if no new hotspot list is created (decision 404, no branch). In one embodiment, HPDP 104 must register a minimum number of new operations accessing the hotspot for HPDP 104 to determine a hotspot list is populated or empty. If, however, the hotspot list is not empty, HPDP 104 continues to step 406. In other embodiments, HPDP 104 uses machine learning technology to determine if enough new operations have accessed the hotspot for HPDP 104 to determine if the hotspot list is populated or empty through optimization. In one embodiment, HPDP 104 uses a dynamic feedback method to adjust the necessary number of additions to the hotspot list to either use a prior CCVR, an OVR, or to calculate a new CCVR.

In step 406, HPDP 104 identifies transactions accessing the hotspot through transaction log 114. The result of this step is a list of transactions accessing the hotspot that HPDP 104 is currently analyzing. In some embodiments, the transactions accessing the hotspot can cooperate with one another, and these transactions that are cooperating are contained within the grouping of relevant transactions. In this hotspot HPDP 104 is viewing transactions that are both relevant to the calculation of the CCVR and transactions that are not relevant to the calculation of the CCVR. In one embodiment using dynamic feedback method, HPDP 104 is able to exclude all non-relevant transactions and will not need to incorporate step 408 and step 410. In one embodiment, HPDP 104 will have operator or third party set parameters to determine the relevant and non-relevant transactions in the hotspot.

In step 408, HPDP 104 identifies the destination hotspot by identifying a hotspot being accessed by the majority of second read operations. This destination hotspot is necessary to assist in the removal of all the non-relevant transactions that are populating the list of transactions. In one embodiment, the destination hotspot, $hp_d$, is accessed by the second read operation, denoted as r(TabB.b). In one embodiment, the source hotspot would be the initial hotspot while the destination hotspot is the next chronological hotspot in a list of hotspots. In other embodiments, the destination hotspot can be any hotspot after the source hotspot selected by a dynamic system, an operator, or another system or program to determine the most effective hotspot to create a CCVR.

In step 410, HPDP 104 prunes transactions in the hotspots that are non-relevant In one embodiment, there are two tables TabA and TabB and $hp_d$ is looking for transactions that accesses the hotspot at a higher than usual rate. In this embodiment, three transaction patterns are searched for; TypeA—r(TabA.a) r(TabB.b) w(TabA.a), TypeB—r(TabA.a) r(TabB.b) w(TabB.b), and TypeAB—r(TabA.a) r(TabB.b) w(TabA.a)w(TabB.b). For this embodiment the source hotspot (represented by $hp_s$) is always in table TabA and is the currently inspected hotspot. The destination hotspot (represented by $hp_d$) accessed by the second read transactions, denoted as r(TabB.b). In this embodiment, all identified transactions start with a read operation r(TabA.a). In r(TabA.a) for example the .a represents that the hotspot is in the source hotspot $hp_s$, while a .k or a .g denotes that the hotspot is not within the source hotspot $hp_s$. If r(TabA.b) is the read operation, the .b would denote that the hotspot is the destination hotspot $hp_d$. The identified list might contain non-relevant transactions, starting with patterns such as, but not limited to, r(TabA.a) r(TabC.g) or r(TabA.a) r(TabB.k) with transaction TabB.k being a data item not in hotspot $hp_d$. The table containing hotspot $hp_d$ is automatically identified as TabB. With the knowledge of both hotspots $hp_s$ and $hp_d$ the elimination of all non-relevant transactions from the hotspot list leaves only TypeA, TypeB, and TypeAB elements within the list. In other embodiments, HPDP 104 will use a dynamic feedback system, an optimization system, or a third party method to determine the correct transactions that are to be eliminated. In one embodiment, the operator can manually remove, or add transactions to the current hotspot list.

In step 412, HPDP 104 calculates a CCVR value for the current hotspot. In one embodiment, HPDP 104 uses this list to feed a stochastical model equation. In one embodiment, HPDP 104 will use the equation below as the stochastical model:

$$1 - \frac{(MPL-1)*F^2}{H}[f_A^2 + 2f_Af_{AB} + f_B^2 + 2f_Bf_{AB} + f_{AB}^2]\alpha \over \frac{(MPL-1)*F^2}{H}[2f_Af_B]\alpha$$

In this embodiment, H represents the hotspot affinity, this variable is the sum of the size of $hp_s$ plus the size of $hp_d$ divided by two. The size of the hotspot is the measurement interval of each hotspot. F represents the fraction of relevant transactions accessing both the source hotspot $hp_s$ and the destination hotspot $hp_d$. F is the size of all the none pruned transactions divided by all the transactions accessing the hotspot area (the hotspot area is the accumulation of both the source hotspot $hp_s$ and the destination hotspot $hp_d$). MPL is the Multi Programming Level (MPL) and is the number of parallel executed transactions within the hotspot area. $f_A$ represents the transaction types that are of type A within the measuring interval that HPDP 104 is analyzing transaction within, $f_B$ represents the transaction types that are of type B within the measuring interval that HPDP 104 is analyzing transaction within, $f_{AB}$ represents the transaction types that are of type AB within the measuring interval that HPDP 104 is analyzing transaction within. Symbol a parameter represents the timing information, putting the average server transaction runtime in relation to the complete average transaction runtime from an operator's perspective. MPL represent the number of parallel executed transactions. In other embodiments, this equation can be modified by the operator, a third party, or machine learning technologies such as an optimization program, or a dynamic feedback system to calculate a CCVR value. In one embodiment, hotspot specific CCVR are summed up and the measurement interval wide CCVR is expressed as the arithmetic average of a quantity of hotspot CCVRs. In one embodiment, the CCVR will be the OVR for all hotspots.

In step 414, HPDP 104 outputs the calculated CCVR and continues to step 210 of process 200. In one embodiment, HPDP 104 outputs the calculated CCVR and sends the calculated CCVR directly to VRH database 106. In one embodiment, HPDP 104 allows the operator to decide if the CCVR should be used, or if the CCVR should be deleted. In one embodiment, an operator can set how many CCVR HPDP 104 will output before HPDP 104 stops building hotspot lists. In other embodiments, HPDP 104 will use a dynamic feedback system or determine when the desired amount of CCVRs are calculated before stopping HPDP 104 to build the hotspot list.

Figure 5:
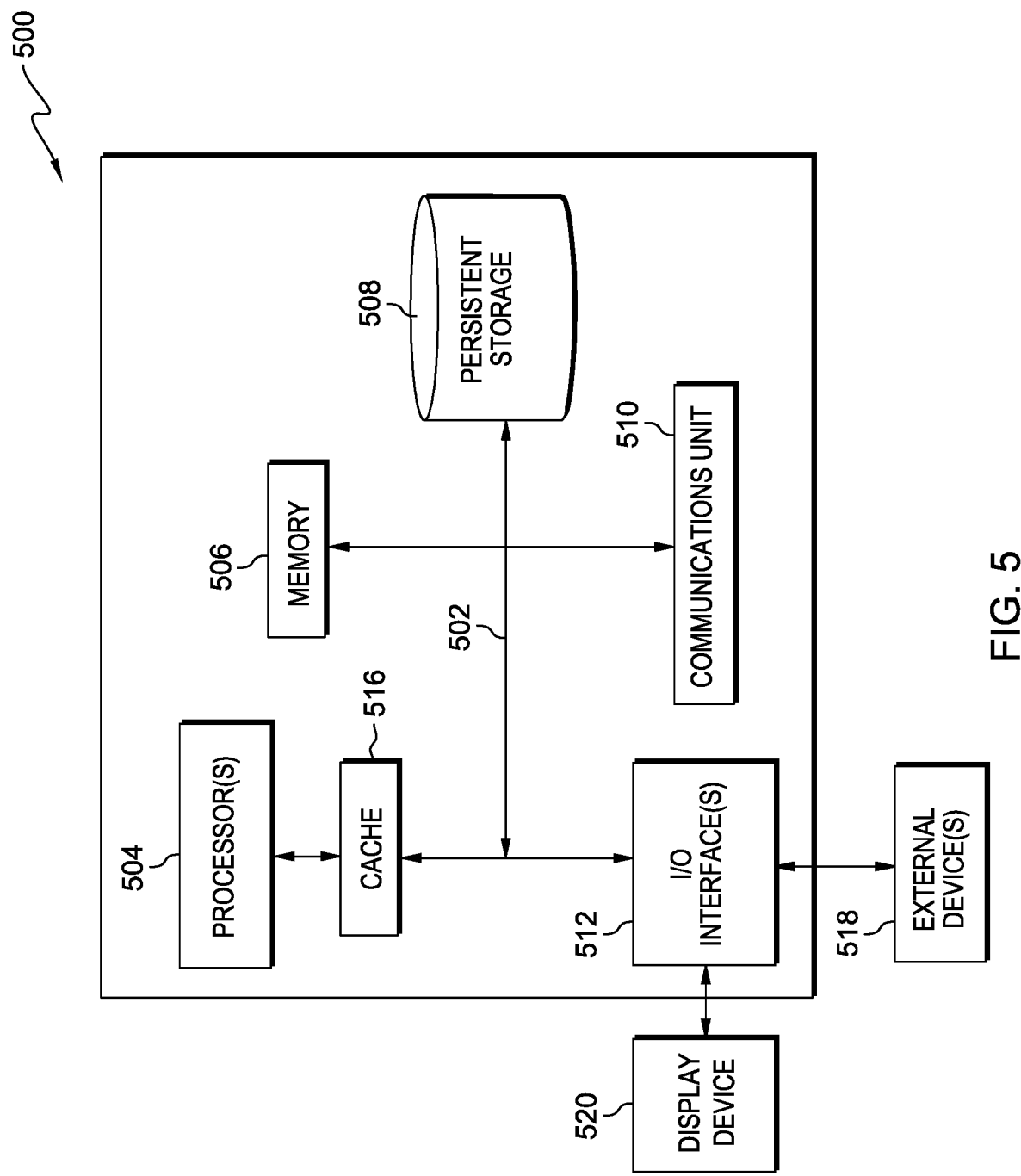
FIG. 5 is a block diagram of internal and external components of the server and SQL server of FIG. 1, in accordance with one embodiment of the present invention.

FIG. 5 depicts a block diagram of components of server 102, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server 102 include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In one embodiment, memory 506 includes random access memory (RAM) 514 and cache memory 516. In general, memory 506 can include any suitable volatile or non-volatile computer-readable storage media.

HPDP 104, VRH database 106 and SML database 108 are stored for execution by one or more of the respective computer processors 504 of server 102 via one or more memories of memory 506 of server 102. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in the examples, provides for communications with other data processing systems or devices, including server 102. In the examples, communications unit 510 includes one or more network interface cards. Communications unit 510 may provide communications through the use of either or both physical and wireless communications links. HPDP 104 may be downloaded to persistent storage 508 of server 102 through communications unit 510 of server 102.

I/O interface(s) 512 allows for input and output of data with other devices that may be connected to server 102. For example, I/O interface 512 may provide a connection to external devices 518 such as a keyboard, keypad, camera, a touch screen, and/or some other suitable input device. External devices 518 can also include portable computer-readable storage media such as, for example, thumb drives, portable optical or magnetic disks, and memory cards. Software and data used to practice embodiments of the present invention, e.g., function of HPDP 104 can be stored on such portable computer-readable storage media and can be loaded onto persistent storage 508 of server 102 via I/O interface(s) 512 of server 102. Software and data used to practice embodiments of the present invention, e.g., HPDP 104 can be stored on such portable computer-readable storage media and can be loaded onto persistent storage 508 of server 102 via I/O interface(s) 512 of server 102. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for calculating a probability of a consistency violation of a transaction in a database management system, the method comprising:
   receiving, by one or more processors, a plurality of transactions within a predetermined time period;
   identifying, by one or more processors, a first pattern in a first transaction of the plurality of transactions based on an isolation level of the transaction;
   determining, by one or more processors, that the first pattern of the first transaction matches a preexisting pattern, wherein the preexisting pattern corresponds to values for a mathematical model for estimating a percentage of transactions in violation of consistency criteria;
   extracting, by one or more processors, values from the first transaction based on the determined preexisting pattern; and
   calculating, by one or more processors, the mathematical model using the values from the first transaction and the values from the preexisting pattern.

2. The method of claim 1, further comprising:
   recording, by one or more processors, a result of calculating the mathematical model using the values from the first transaction and the values from a cooperation between the first transaction and a second transaction within the plurality of relevant transactions and the values from the preexisting pattern in a storage location.

3. The method of claim 1, wherein the mathematical model is a function of the isolation level of the first transaction, a time gap between consecutive transactions from a connection, and an average hotspot size.

4. The method of claim 1, further comprising:
   calculating, by one or more processors, an average probability of a consistency violation of a transaction in a database management system for the plurality of transactions based on a result of calculating the mathematical model using the values from the first transaction and the values from the preexisting pattern and a set of one or more previously calculated results, wherein the previously calculated results are each associated with a distinct plurality of transactions.

5. The method of claim 1, further comprising:
   pruning, by one or more processors, a non-relevant transaction from a plurality of hot spots based on the first pattern of the first transaction.

6. The method of claim 5, wherein the non-relevant transaction has a pattern different from the first pattern of the first transaction.

7. The method of claim 2, further comprising:
   receiving, by one or more processors, a second transaction, wherein the second transaction and the first transaction have a similar first pattern; and
   applying, by one or more processors, the result of calculating the mathematical model to the second transaction based on the first pattern of the second transaction, wherein the first pattern of the second transaction is applied to the plurality of relevant transactions to form a second pattern.

8. A computer program product for calculating a probability of a consistency violation of a transaction in a database management system, the computer program product comprising:
   one or more computer readable storage media and program instructions stored on the one or more computer readable storage media, the program instructions comprising:
   program instructions to receive a plurality of transactions within a predetermined time period;
   program instructions to identify a first pattern in a first transaction of the plurality of transactions based on an isolation level of the transaction;
   program instructions to determine that the first pattern of the first transaction matches a preexisting pattern, wherein the preexisting pattern corresponds to values for a mathematical model for estimating a percentage of transactions in violation of consistency criteria;
   program instructions to extract values from the first transaction based on the determined preexisting pattern; and
   program instructions to calculate the mathematical model using the values from the first transaction and the values from the preexisting pattern.

9. The computer program product of claim 8, further comprising:
   program instructions, stored on the one or more computer readable storage media, to record a result of calculating the mathematical model using the values from the first transaction and the values from a cooperation between the first transaction and a second transaction within the plurality of relevant transactions and the values from the preexisting pattern in a storage location.

10. The computer program product of claim 8, wherein the mathematical model is a function of the isolation level of the first transaction, a time gap between consecutive transactions from a connection, and an average hotspot size.

11. The computer program product of claim 8, further comprising:
   program instructions, stored on the one or more computer readable storage media, to calculate an average probability of a consistency violation of a transaction in a database management system for the plurality of transactions based on a result of calculating the mathematical model using the values from the first transaction and the values from the preexisting pattern and a set of one or more previously calculated results, wherein the previously calculated results are each associated with a distinct plurality of transaction.

12. The computer program product of claim 8, further comprising:
program instructions, stored on the one or more computer readable storage media, to prune a non-relevant transaction from a plurality of hot spots based on the first pattern of the first transaction.

13. The computer program product of claim 8, wherein the non-relevant transaction has a pattern different from the first pattern of the first transaction.

14. The computer program product of claim 9, further comprising:
program instructions, stored on the one or more computer readable storage media, to receive a second transaction, wherein the second transaction and the first transaction have a similar first pattern; and
program instructions, stored on the one or more computer readable storage media, to apply the result of calculating the mathematical model to the second transaction based on the first pattern of the second transaction, wherein the first pattern of the second transaction is applied to the plurality of relevant transactions to form a second pattern.

15. A computer system for calculating a probability of a consistency violation of a transaction in a database management system, the computer system comprising:
one or more computer processors, one or more computer readable storage media, and program instructions stored on the computer readable storage media for execution by at least one of the one or more processors, the program instructions comprising:
program instructions to receive a plurality of transactions within a predetermined time period;
program instructions to identify a first pattern in a first transaction of the plurality of transactions based on an isolation level of the transaction;
program instructions to determine that the first pattern of the first transaction matches a preexisting pattern, wherein the preexisting pattern corresponds to values for a mathematical model for estimating a percentage of transactions in violation of consistency criteria;
program instructions to extract values from the first transaction based on the determined preexisting pattern; and
program instructions to calculate the mathematical model using the values from the first transaction and the values from the preexisting pattern.

16. The computer system of claim 15, further comprising:
program instructions, stored on the one or more computer readable storage media, to record a result of calculating the mathematical model using the values from the first transaction and the values from a cooperation between the first transaction and a second transaction within the plurality of relevant transactions and the values from the preexisting pattern in a storage location.

17. The computer system of claim 15, further comprising:
program instructions, stored on the one or more computer readable storage media, to calculate an average probability of a consistency violation of a transaction in a database management system for the plurality of transactions based on a result of calculating the mathematical model using the values from the first transaction and the values from the preexisting pattern and a set of one or more previously calculated results, wherein the previously calculated results are each associated with a distinct plurality of transaction.

18. The computer system of claim 15, further comprising:
program instructions, stored on the one or more computer readable storage media, to prune a non-relevant transaction from a plurality of hot spots based on the first pattern of the first transaction.

19. The computer system of claim 15, wherein the non-relevant transaction has a pattern different from the first pattern of the first transaction.

20. The computer system of claim 16, further comprising:
program instructions, stored on the one or more computer readable storage media, to receive a second transaction, wherein the second transaction and the first transaction have a similar first pattern; and
program instructions, stored on the one or more computer readable storage media, to apply the result of calculating the mathematical model to the second transaction based on the first pattern of the second transaction, wherein the first pattern of the second transaction is applied to the plurality of relevant transactions to form a second pattern.

* * * * *